June 25, 1968  J. C. JUREIT ET AL  3,389,812
APPARATUS FOR UNLOADING AND STORING WOODEN STRUCTURAL ELEMENTS
Filed Sept. 9, 1966  6 Sheets-Sheet 1

INVENTORS
JOHN C. JUREIT
BERNY L. SMITH
BY *LeBlanc & Shur*
ATTORNEYS

June 25, 1968   J. C. JUREIT ET AL   3,389,812
APPARATUS FOR UNLOADING AND STORING WOODEN STRUCTURAL ELEMENTS
Filed Sept. 9, 1966   6 Sheets-Sheet 2

INVENTORS
JOHN C. JUREIT
BERNY L. SMITH

BY *LeBlanc & Shur*

ATTORNEYS

June 25, 1968 J. C. JUREIT ET AL 3,389,812
APPARATUS FOR UNLOADING AND STORING WOODEN STRUCTURAL ELEMENTS
Filed Sept. 9, 1966 6 Sheets-Sheet 4
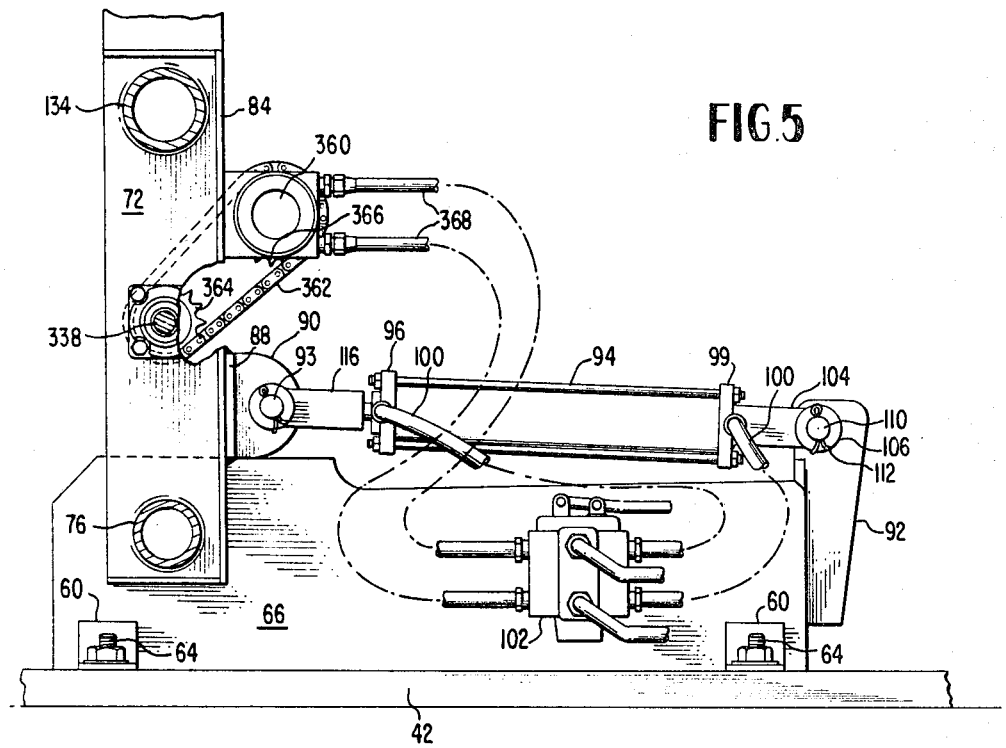
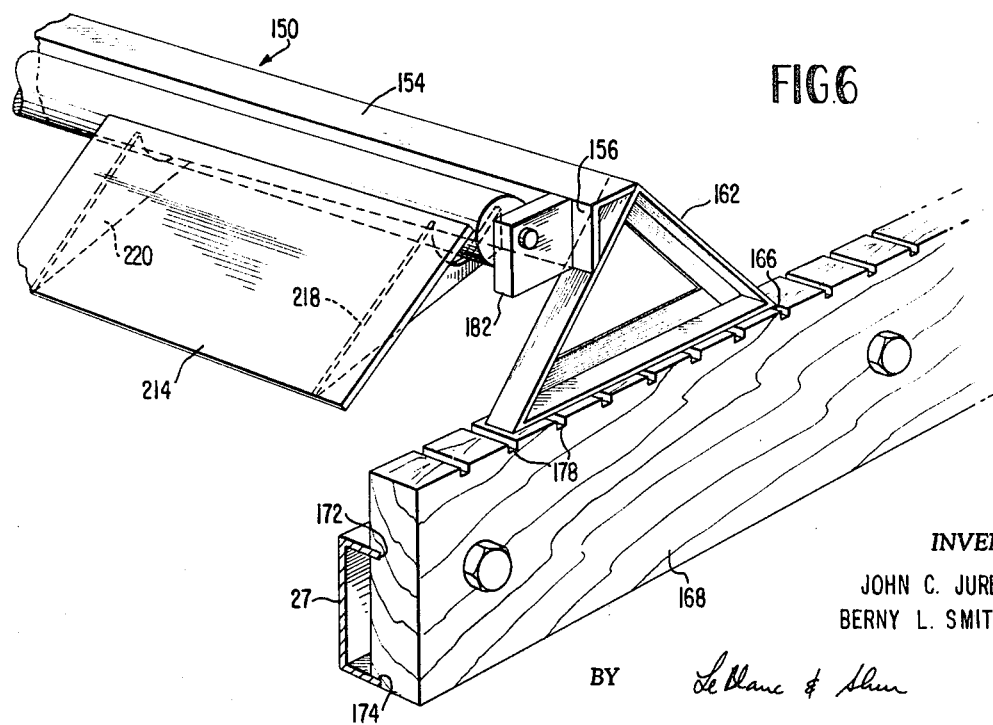
INVENTORS
JOHN C. JUREIT
BERNY L. SMITH
BY *LeBlanc & Shur*
ATTORNEYS

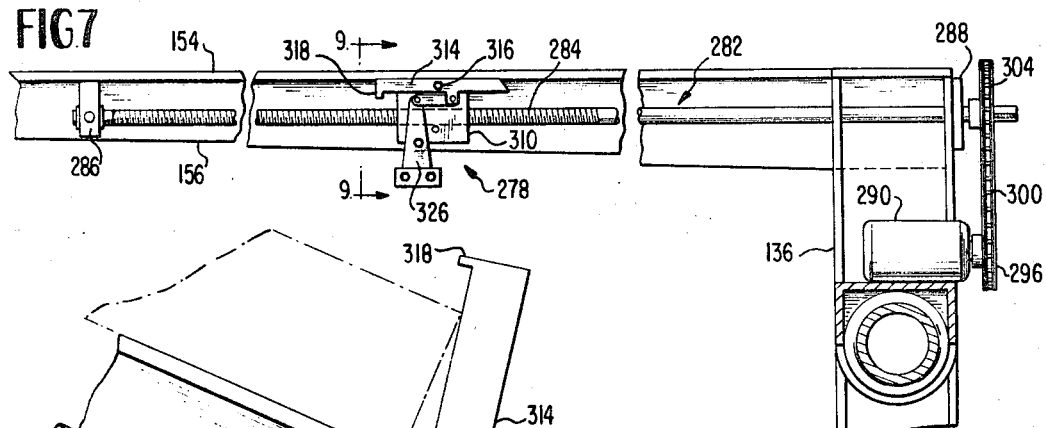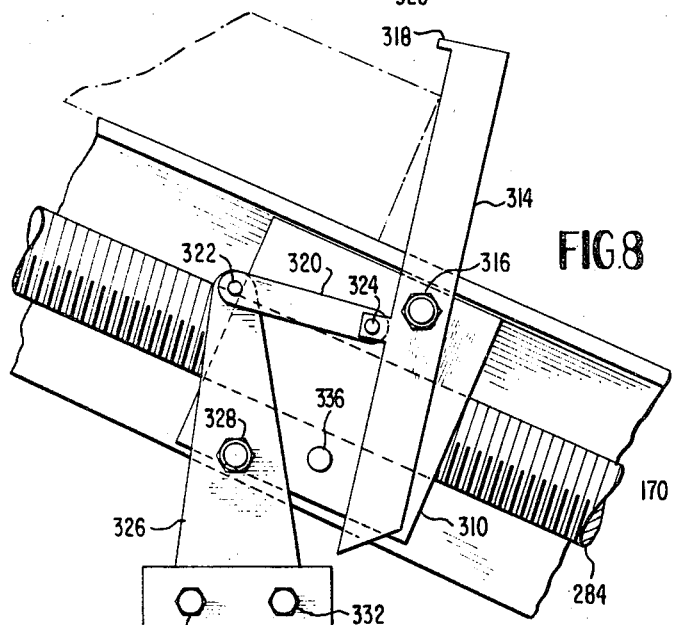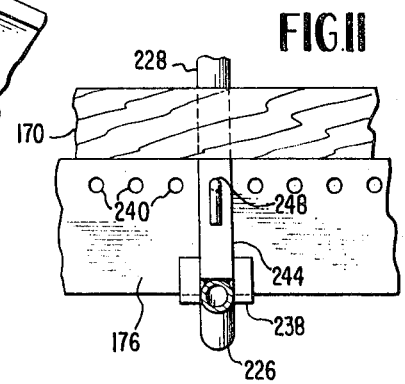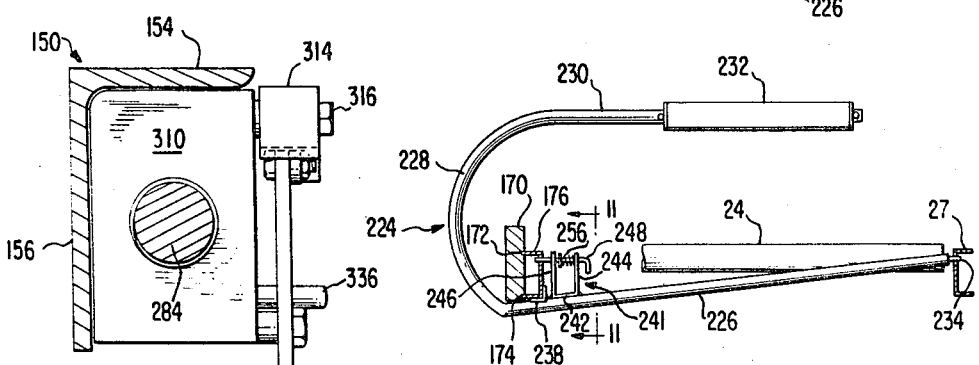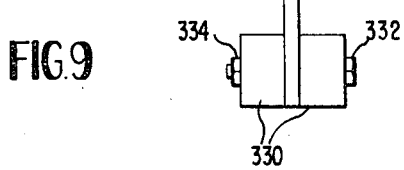

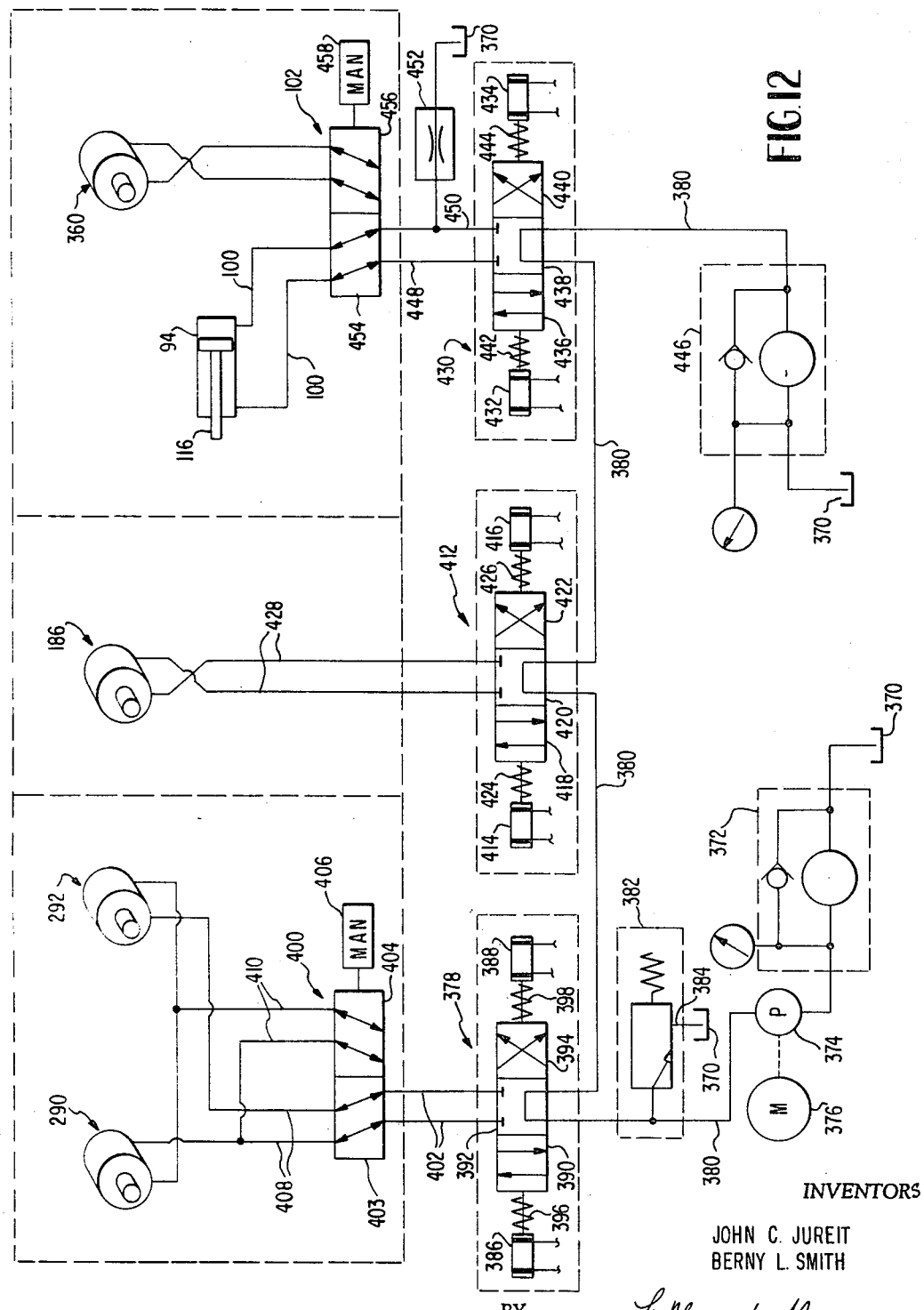

United States Patent Office 3,389,812
Patented June 25, 1968

3,389,812
APPARATUS FOR UNLOADING AND STORING WOODEN STRUCTURAL ELEMENTS
John C. Jureit, Coral Gables, and Berny L. Smith, Miami, Fla., assignors to Automated Building Components, Inc., Miami, Fla., a corporation of Florida
Filed Sept. 9, 1966, Ser. No. 578,365
28 Claims. (Cl. 214—7)

This invention relates to automatic wooden structure producing machinery and more particularly to apparatus which aids in the unloading and storage of wooden structural elements produced by automatic machinery.

In recent years, the building trades have shown a marked trend toward prefabrication of structural components, this has been particularly true in the construction of structural components for building relatively low-cost housing. Various portions of houses have been pre-assembled in this fashion; probably the most commonly prefabricated element being the monoplane roof truss.

At the same time, prefabrication tehniques and practices have undergone an evolution from the original practice of hand-nailing and bolting together of a roof truss to the vastly improved mode of construction which was made possible by the advent of structural butt joints formed from unitary connection plates of the type described in United States Patent No. 2,877,520, of common ownership herewith, issued Mar. 15, 1959. However, whereas it is now possible to manufacture trusses of various sizes with a minimum of skilled labor and at markedly reduced cost, all the heretofore known systems for unloading and stacking completed trusses manufactured in this fashion have relied on one or more laborers to manually lift the completed trusses from the final step of the pressing assembly and transfer them to appropriate storage or transportation facilities. It is accordingly a purpose of this invention to overcome these and other deficiency encountered in past systems for the unloading and stacking of completed trusses.

According to the present invention, an automatic truss unloading and stacking device is provided at the output side of the press to enable the automatic removal of jig mounted completed trusses, without the manual aid of the press operator and/or a helper. The apparatus of this invention therefore enables automated jig unloading and storage of completed trusses without the necessity of manual laborers, and thus substantially increases the rate of truss production, while at the same time reducing manufacturing costs.

The foregoing is accomplished according to the present invention by removing the truss from its associated jig, as the jig progressively emerges from the truss forming press. The continual forward movement of the jig from the press results in the placement of the completed truss upon a pivotally mounted supporting roller assembly which is positioned at the output of the press, and above the conveyor over which the jig moves. Thereafter the roller assembly is pivoted to place the completed truss into an appropriate storage rack.

It is accordingly a primary object of the present invention to provide a jig unloading and storing apparatus.

It is another object of this invention to provide unloading and storing apparatus which is operable to mechanically remove a completed wooden structural element from a mounting fixture and store the same in appropriate storage or transportation facilities.

It is yet another object of the invention to provide an apparatus which enables rapid unloading and storage of press completed trusses without the exertion of manual effort by the press operator.

It is a further object of this invention to provide a truss unloading and storage apparatus which may be utilized with commercially available presses and required no modification thereto.

It is a further object of this invention to provide a truss unloading and storage apparatus which is economical to manufacture, long-lasting and easy to install.

Still another object of this invention is to provide a truss unloading and storage apparatus which will permit an increase in the production rate of truss producing machinery while reducing manual labor and production costs.

It is still another object of the invention to provide an apparatus for unloading and storing jig mounted completed trusses utilizing a pair of boom supports normally supported in spaced-apart position along and above the path of jig travel, with rotatably mounted rollers mounted on each of the boom supports, and means for elevating the leading end of the truss from the jig as it emerges from a pressing operation, the elevated end of the truss initially engaging the leading one of the boom supported rollers and thereafter assuming a position upon the pair of spaced-apart rollers due to progressive passage of the jig from the press, and with means for pivoting the pivotally mounted boom supports to result in storage of the completed truss.

These and further objects and advantages of the invention will become more apparent upon reference to the following specification, claims and appended drawings, wherein:

Figure 1:
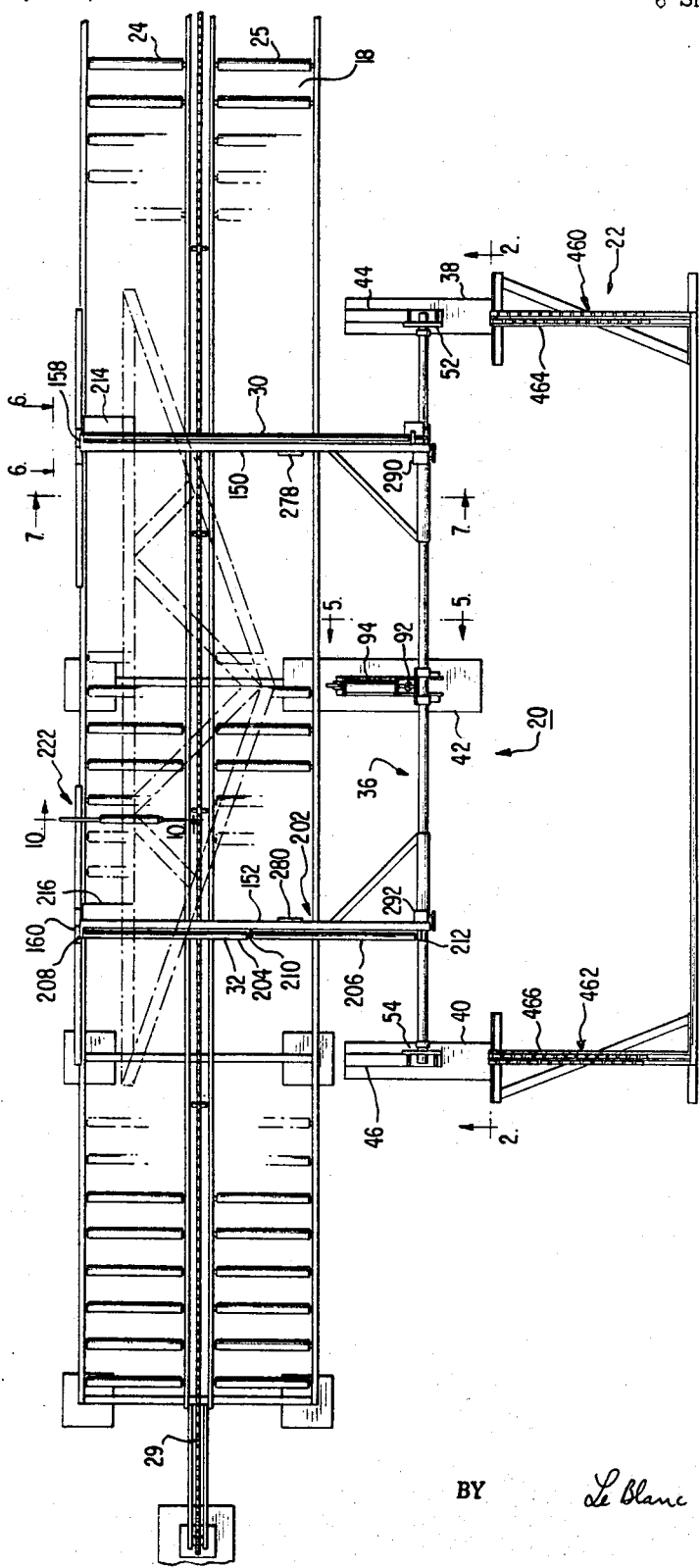
FIGURE 1 is a plan view which illustrates the output end of a truss manufacturing system that incorporates a truss unloading and stacking apparatus made in accordance with this invention.
Figure 4:
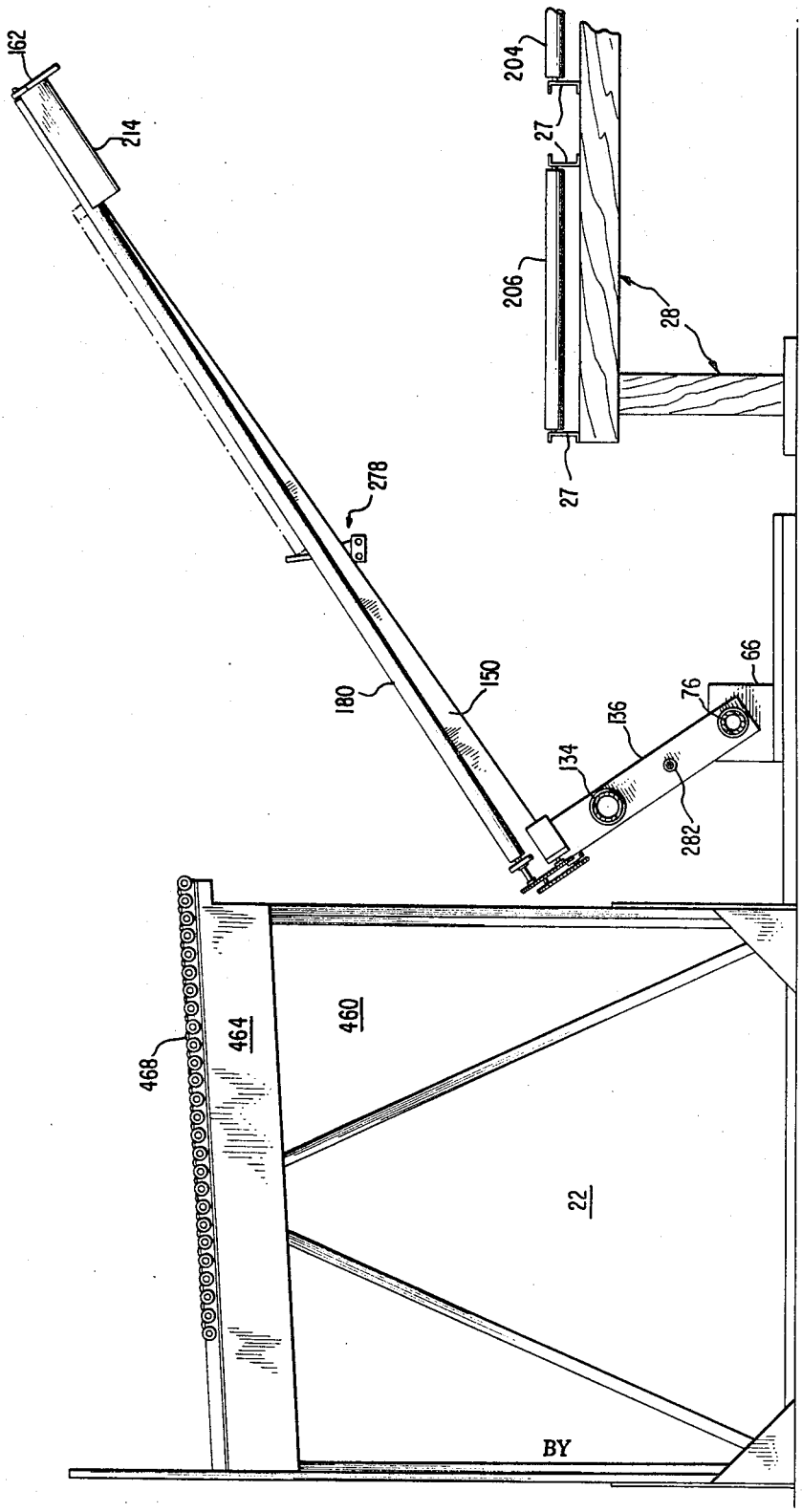
FIGURE 4 is a vertical section which illustrates a completed truss, in phantom, being transferred by the truss unloading and storing apparatus of this invention to a truss storage rack.

FIGURE 5 is a fragmentary vertical section taken along the line 5—5 of FIGURE 1 and illustrates the hydraulic cylinder which is operated to result in movement of the truss supporting booms from the position shown in FIGURE 1 to the truss storage position graphically shown by FIGURE 4, also shown are the appropriate means by which the spacing between the booms may be adjusted to accommodate varying truss sizes;

FIGURE 6 is a partial fragmentary perspective view taken along the line 6—6 of FIGURE 1 and illustrates the supporting arrangement for the boom supports and, as well, the ramp associated with each boom to elevate and direct the truss to the rollers which are rotatably mounted on the boom;

FIGURE 7 is a fragmentary vertical section view taken along the line 7—7 of FIGURE 1 and illustrates the manner in which the truss gripping mechanism employed with the truss unloading apparatus of this invention is mounted for adjustable positioning on the boom;

FIGURE 8 is a fragmentary view illustrating the position that the truss gripping mechanism assumes relative to a completed truss, shown in phantom, during an unloading operaticn of the device of the invention;

FIGURE 9 is a vertical section taken along the line 9—9 of FIGURE 7 and illustrates the inter-relationship of the elements making up the truss gripping mechanism of this invention, and their relationship to the boom structure employed;

FIGURE 10 is a partial vertical section taken along the line 10—10 of FIGURE 1 and illustrates a helper roller used to insure proper transfer of the truss from the powered leading roller to the rear idler roller;

FIGURE 11 is a partial vertical section taken along the line 11—11 of FIGURE 10 and brings out the manner of adjusting the longitudinal position of the helper roller between the spaced-apart boom supports as shown in FIGURE 1; and FIGURE 12 is a diagrammatic view of the hydraulic circuitry for operating the various adjustable elements of the apparatus made in accordance with this invention.

Referring to FIGURE 1 of the drawings, a truss unloading and storing apparatus indicated generally by the number 20, is positioned spacially above, and along the path of travel of the terminal portion of a conveyor system 18. The conveyor system 18 provides the means by which truss loaded jigs are moved into and out of a suitable press, not shown, wherein the elements making up the truss are fixedly connected together by the hereinabove mentioned unitary connector plates. Further, a truss storage rack is shown by the numeral 22 to be positioned behind truss unloading and storing device 20. Completed trusses are lifted from appropriate jig assemblies carried over conveyor system 18 by the truss unloading and storing device 20, and are stacked up the truss rack 22 in a manner to be described in greater detail hereinafter. A suitable jig assembly is described in United States Patent No. 3,241,585, of common ownership herewith, issued on Mar. 22, 1966.

Figure 3:
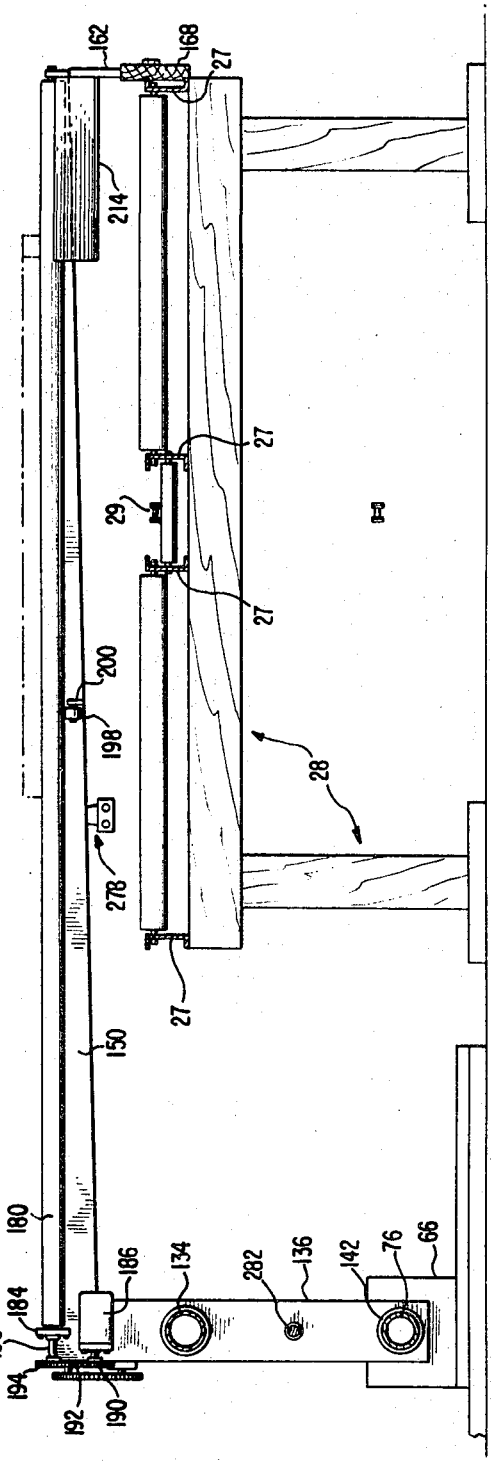
FIGURE 3 is a vertical section taken along the line 3—3 of FIGURE 2 and illustrates the truss loading elevational disposition of a driven truss positioning roller relative to the jig carrying conveyor system arranged sub-adjacent thereto.

More particularly, the jig mounted completed truss will be moved upon the dual rollers 24, 25 of conveyor 18 which are shown in FIGURE 3 to be rotatably mounted in longitudinally extending, channel shaped support brackets 27. The brackets 27 are supported by a suitable table or frame generally referred to by the numeral 28. The jig is moved over the dual rollers by way of an endless chain driving arrangement 29, the construction and operation of which form no part of the present invention.

Figure 2:
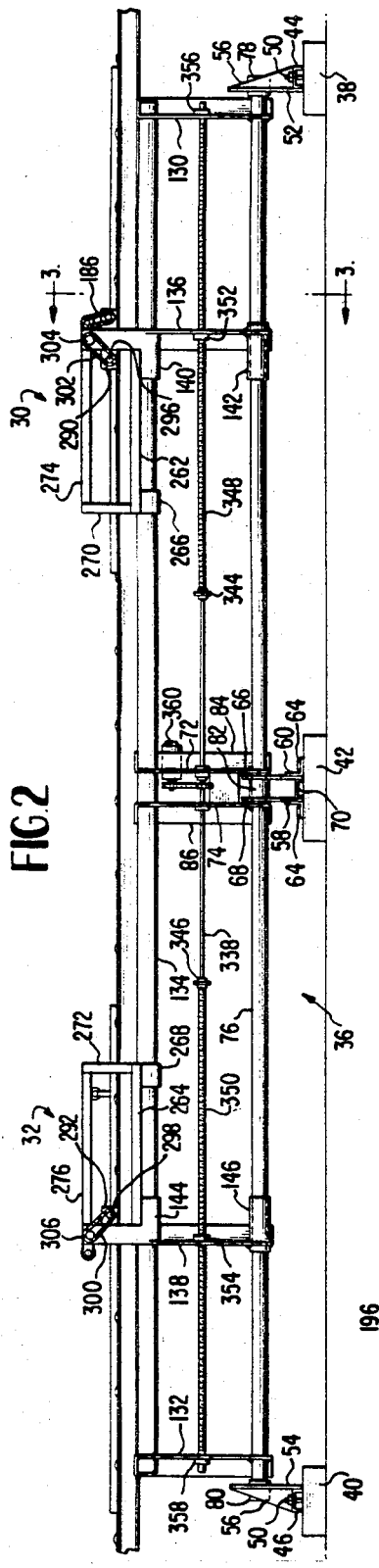
FIGURE 2 is a side elevational view taken along the line 2—2 of FIGURE 1 and illustrates the relationship of the truss unloading device of the invention overlying a conventional conveyor system over which the jig travels into and from an appropriate press.

As shown by FIGURES 1 through 4 of the drawings, the truss unloading and storage apparatus 20 of the invention includes a forward boom support assembly 30 and a rear boom support assembly 32 normally spacially supported along and above the conveyor 18. The forward boom support assembly 30 and the rear boom support assembly 32 are longitudinally positionable upon the pivotable frame assembly generally shown by the numeral 36, for movement between the jig unloading position as shown by FIGURES 1, 2 and 3 and the truss storing position shown in FIGURE 4.

The pivotable frame assembly 36 must be fixedly held in position adjacent to the path of travel of the truss mounted jig in order to enable the transfer of the completed trusses from the jigs to the longitudinally spaced-apart rollers which are rotatably mounted on the front and rear boom support assemblies 30 and 32, and also to enable the movement of the front and rear boom assemblies between their jig unloading positions transversely above the conveyor 18 and the truss storage position shown by FIGURE 4. Providing the necessary rigid support for frame assembly 36 are longitudinally aligned rectangular cement foundations or footings 38 and 40, and, cement foundation 42 which supports the means for hydraulically pivoting the pivotable frame assembly 36 to accomplish the stacking of completed trusses in truss rack 22. As shown in FIGURES 1 and 2, there are mounted on cement footings 38 and 40 elongated, inverted channels 44 and 46. These are secured by nuts and cement imbedded studs 50. A pair of upright support plates 52 and 54 are respectively welded to inverted channels 44 and 46 and are braced by suitable gusset plates 56. As illustrated by FIGURE 2, upright support plates 52 and 54 provide the main outer supports for the entire weight of the truss unloading and storing unit.

Referring to FIGURES 2 and 5, a series of pairs of spacially opposed angle brackets 58 and 60 are mounted by nuts and cement embedded bolts 64 to the centrally positioned cement foundation 42. A pair of upright, laterally spaced apart plates 66 and 68 are fixedly welded in opposed relationship to the angle brackets 58 and 60. A channel shaped web 70 is welded to the bottom of the opposed inner faces of upright plates 66–68 and a pipe 82 passes through suitable apertures in and is welded to plates 66 and 68.

As shown in FIGURE 2, a pivot pipe 76 longitudinally extends across the entire frame assembly 36, and is journalled for rotation within suitable bearings 78–80, provided in upright support plates 52 and 54, respectively, and in the pipe 82. A pair of upright pivot brackets 72 and 74 are provided with suitable apertures for the passage of pivot pipe 76 therethrough, and are shown, in FIGURE 2, to be welded to the outer surface of the pivot pipe.

Upright pivot brackets 72–74 are respectively provided with oppositely directed mounting flanges 84–86 to which is welded a truss unloading cylinder mounting plate 88, as shown in FIGURE 5. An arcuate aperture ear 90 is mounted on plate 88 as seen in FIGURES 1 and 5. The truss unloading cylinder 94 is supported from this ear by a bifurcated saddle 92 which is pinned thereto at 93.

Truss unloading cylinder 94 is provided with conventional end plates 96 and 99 connected by suitable hoses 100 to a manually actuatable double selector valve 102, which is of conventional construction and whose operation is well known to those skilled in the art. The hydraulic circuitry for the invention will be discussed in greater detail hereinbelow in connection with FIGURE 12. End plate 99 is provided with a mounting rod 104 which terminates in a bifurcated mounting head 106 having a mounting pin 110. Mounting pin 110 secures the mounting head 106 to a bifurcated saddle 92, and by suitable means, such as a cotter pin 112, the pivotable connection between end plate 99 and bifurcated saddle 92 is fixedly maintained. Truss unloading cylinder 94 has a piston 116 which is reciprocally driven by cylinder 94 in accordance with the receipt of pressurized fluid into either end plates 96 or 99, with the other end plate concurrently providing the means for fluid discharge.

During operation of the apparatus, upon pressurized fluid being supplied to end plate 99 of truss unloading cylinder 94, piston 116 moves outwardly to pivot the upright pivot brackets 72 and 74 in a counter-clockwise direction about pivot pipe 76, as may be seen in FIGURE 5. In this manner, as will be made clear hereinbelow, both the front and rear boom support assemblies 30 and 32 are moved from their normal generally horizontal truss removing positions above conveyor 18 to their almost vertical unloading positions for storing a completed truss in a suitable storage rack 22, as is best appreciated in FIGURE 4.

The structural makeup of the pivotable frame assembly 36 will now be discussed in greater detail. As previously mentioned, the frame assembly 36 is mounted for pivotable movement about pivot pipe 76, which, in turn, is journalled for rotation about bearings 78 and 80 provided in opposed upright support plates 52–54. The frame assembly also includes, at the ends of pivot pipe 76, see FIGURES 1 and 2, a pair of upright support members 130–132 which are fixedly mounted, as by welding or brazing. Carried by the upright support members 130 and 132 and by the central upright pivot brackets 72 and 74 is an upper support pipe 134.

As shown in FIGURE 2, front boom assembly 30 and rear boom assembly 32 are mounted for longitudinal movement along pivot pipe 76 and upper support pipe 134. The spacing between assemblies 30 and 32 is adjustable, in a manner to be discussed in greater detail hereinafter, in accordance with the size of the truss being manufactured. In the interest of brevity, since the structure of the rear boom assembly 32 is the same as the front boom assembly 30, with the exception of the roller system employed, the roller systems being discussed in greater detail hereinbelow, the structural makeup of the front boom assembly will be described with the rear boom assembly counterpart structure being appropriately numbered and named for independent reference thereto.

Front boom assembly 30 and rear boom assembly 32 are shown to be mounted on opposite sides of the centrally positioned upright pivot brackets 72–74 for slidable movement toward and away from each other along longitudinally fixed pivot pipe 76 and upper support pipe 134. As shown in FIGURE 2, assemblies 30 and 32 are each provided with an upright angled support member 136 and 138. The angled support member 136 of front boom assembly 30 carries suitable cylindrical sleeves 140 and 142 for positioning over upper support pipe 134 and pivot pipe 76 respectively to enable sliding movement therealong. Similarly, cylindrical sleeves 144 and 146 are fixedly connected to angled support 138 of the rear boom assembly 32 to enable its positioning along upper support pipe 134 and pivot pipe 76. At the same time, the slidable bearing connections to spaced-apart pipes 76 and 134 results in the front and rear boom assemblies 30 and 32 being pivotable along with frame assembly 36 in response to actuation of truss unloading cylinder 94.

As shown in FIGURES 1, 3 and 6, front boom assembly 30 is provided with a horizontal boom angle 150, one end of which is fixedly connected to the uppermost end of upright support member 136 for movement therewith. Rear boom assembly 32 is provided with a similarly constructed and connected boom 152. The front and rear booms 150 and 152 extend transversely across and over the conveyor system 18. As seen in FIGURE 9, boom members 150 and 152 are each provided with a horizontally extending top flange 154 and a longitudinally tapered, side flange 156. The distal ends 158 and 160 of front and rear booms 150 and 152 have affixed thereto triangular support frames 162 and 164, as best seen in FIGURE 6. As the completed trusses move from the jigs to the booms, they exert a substantial longitudinal force upon the booms. To satisfactorily handle this force, front and rear boom locking members 168 and 170 are provided. The members may constitute wooden beams having a pair of vertically spaced longitudinally extending slots 172 and 174 which receive the flanges of the channels 27 to which they are bolted.

As shown in FIGURE 6, the upper surfaces of front and rear boom locking members 168 and 170 are provided with a plurality of equally spaced transversely extended kerfs 178. The kerfs 178 cooperate with a depending latching tab 166 on triangular frames 162 and 164. Thus, when the triangular support frames 162 and 164 assume a supported position upon front and rear boom locking members 168 and 170, in a manner as shown, the tabs and kerfs cooperate to appropriately lock the booms 150 and 152 in place and prevent any longitudinal movement thereof due to truss movement thereupon. In FIGURE 3, the boom member 150 is shown in its jig unloading position with the triangular frame 162 supported upon front boom locking member 168.

As has been previously mentioned, the completed trusses are removed from the jig upon which they are mounted by the continuing movement of the jig sub-adjacent the boom assemblies. In order to assist in the removal of the trusses, the front boom support assembly 30 is provided with a powered roller 180 which is journalled in suitable bearings 182 and 184, mounted on the vertical flange 156 of boom 150, see FIGURES 3 and 6. The top of front roller 180 is slightly above front boom 150 to insure that the trusses will be rotatably supported on the former. The roller 180 is driven by a suitable hydraulic truss positioning motor 186 mounted on upright support member 136 of front boom support assembly. Hydraulic truss positioning motor 180 rotates in a forward or reverse direction as determined by the appropriate hydraulic circuitry as shown in FIGURE 12. The motor carries a driving sprocket 190 which cooperates with an endless chain 192 to drive a driven sprocket 194 carried by a shaft 196 extending from front roller 180. Through the above structural arrangement, front roller 180 will be driven in a forward direction to assist in the removal of trusses from their associated jigs or in a direction in reverse thereto, in accordance with the control circuitry of FIGURE 12, which will be discussed in greater detail hereinafter.

Because of the length of front roller 180, which extends across and slightly above front boom member 150, a central support roller 198 is provided, see FIGURE 3, to prevent sagging or undesirable stresses or strains from developing therein. Support roller 198 is rotatably mounted on bearing 200, which in turn is shown in FIGURE 3 to be fixedly connected centrally on the laterally tapered flange 156 of boom member 150.

As has been previously mentioned, the front roller 180 is powered in order to assist in the removal of jig mounted trusses as they emerge from the press, however, the rear roller unit, generally indicated by the numeral 202, is not. Referring to FIGURE 1, rear roller unit 202 comprises dual rollers 204 and 206 which are rotatably journalled in suitable bearings 208, 210 and 212, supported on the rear boom member 152. The rear roller unit is slightly above rear boom 152 in elevational alignment with front roller 180. FIGURE 1 illustrates, in phantom, the final position that a completed truss assumes upon the front roller 180 and rear roller unit 202 of front and rear boom assemblies 30 and 32 respectively.

In order to facilitate the removal of completed jig mounted trusses as they emerge from the press and to aid in the lifting of the completed truss upon the longitudinally spaced-apart front roller 180 and rear roller unit 202, angularly disposed front and rear boom ramps 214 and 216 (see FIGURES 1, 3 and 6) extend downwardly and away from rollers 180 and 202 into the path of travel of a truss mounted jig. As shown in FIGURE 6, the front and rear boom ramps 214 and 216 are respectively fixedly positioned forwardly of front roller 180 and rear roller unit 202 by support arms 218 and 220, which are welded to the booms and which establish the downwardly directed disposition of the ramps 214 and 216. Therefore, as the completed truss mounted jig leaves the press, the leading end of the truss will engage the front angularly disposed boom ramp 214, and the continuing forward movement of the jig upon conveyor 18 will result in the truss being elevated upon powered front roller 180. At the same time, the jig will continue its forward movement upon conveyor 18, sub-adjacent to the front angularly disposed ramp 214, and be unaffected thereby. Continual movement of the jig through the press, coupled with rotation of front roller 180, by actuation of the truss positioning motor 186, results in the progressive lifting of the completed truss from the jig to which it is mounted to forward roller 180.

Rear angularly disposed boom ramp 216, which is similar in construction and operation to front angularly disposed boom ramp 214, is shown by FIGURE 1 to be fixedly positioned forwardly of rear boom 152, adjacent to triangular frame 164, along the path of travel that a completed truss takes in going from the front roller 180 to the rear roller unit 202, to insure that the truss is smoothly transferred therebetween.

As a further aid in assuring proper transfer of the leading end of a completed truss from the front boom assembly 30 to the rear boom assembly 32, a helper roller unit is provided as shown generally by the number 222 in FIGURE 1. As shown in FIGURE 1, helper roller unit 222 projects upwardly from below the conveyor system 18, to a height approximately equal to that of front roller 180 and rear roller unit 202, and lies along the path of travel that a completed truss takes between front roller 180 and rear roller unit 202.

As illustrated in FIGURES 10 and 11, helper roller unit 222 comprises a one-piece support rod generally indicated by the number 224, which is formed into a substantially U-shaped configuration having a pivotally mounted lower locking leg 226, an arcuate intermediate section 228, and a horizontal roller supporting upper leg 230, which rotatably supports roller 232 along the path of travel that a completed truss takes between the front boom assembly 30 and rear boom assembly 32. It should be appreciated that the helper roller unit 222 acts to complement rear boom ramp 216, and is particularly useful when the size of the truss being manufactured could tilt about the front boom assembly 30 to engage the conveyor system 18 prior to its engagement with rear boom ramp 216.

Referring to FIGURE 10, the pivotally mounted lower locking leg 226 has a terminal pin-shaped end 234 inserted through one of a plurality of longitudinally aligned apertures which are provided in the channel-shaped brackets 27 of conveyor rollers 24. The lower locking leg 226 extends downwardly and outwardly from channel-shaped bracket 27, and passes below the rear boom locking member 170. A locking channel 176 is positioned with its flanges in longitudinally extending spaced slots 172 and 174 formed along the inner surface of locking member 170. In order to permit the helper roller to be adjustably positioned along the path of truss travel, without the necessity of repositioning the fixedly connected end 234 of the lower locking leg 226, and thus accommodate varying sizes of trusses for different spacing between front boom assembly 30 and rear boom assembly 32, a plurality of equally spaced, longitudinally disposed locking apertures 240 are formed in the channel-shaped locking bracket 176, as seen in FIGURE 11. An L-shaped bracket 238 is fixedly connected to the lower locking leg 226, such as by welding, brazing, etc., adjacent the arcuate intermediate section 228 for engagement with the outer, lower corner of locking channel 176. In this manner, the pivotally mounted lower locking leg 226 of the one-support rod is firmly fixed between the channel-shaped mounting bracket 27 and the locking channel 176 to rigidly support helper roller 232.

In order to secure the helper roller in position, a substantially U-shaped latching bolt support bracket, indicated generally by numeral 241 is fixedly mounted to lower locking leg 226, adjacent and rearwardly of the L-shaped bracket 238. This support bracket comprises base member 242, apertured rear face 244 and apertured front face 246. In the preferred embodiment base 242 may be fixedly connected, as by welding, brazing, etc., to lower locking leg 226. The apertured rear face 244 and apertured front face 246 are provided with aligned apertures for passage of a latching bolt, generally indicated by the numeral 248. The latching bolt 248 is provided with a conventional biasing spring 256 to urge the bolt toward an outwardly locking locking position relative to front face 246. In this manner helper roller 222 will have one end of its pivotally mounted lower locking leg 226 fixed, and its other end capable of limited longitudinal movement, by cooperation of locking apertures 240 and latching bolt 248, to permit selective adjustment of the longitudinal position of the helper roller 222 between the front boom assembly 30 and the rear boom assembly 32, and thus insure the smooth transfer of the leading end of the completed truss from the leading powered roller system 180 to the rear roller unit 202. Further movement of the helper roller may be achieved by moving the pin 234 in its end into another hole in the channel 27.

The length of front and rear booms 150 and 152 in extending across and over the entire width of conveyor 18 requires that the booms be properly supported to prevent sagging, bowing, etc. Additional bracing and supports, as shown in FIGURES 1 and 2, for the transversely extending front and rear booms 150 and 152 respectively include front and rear channel-shaped spans 262 and 264, each of which have one end respectively fixedly connected to upright support members 136 and 138. As shown in FIGURE 2, the front and rear channel-shaped spans 262 and 264 extend from the upright support members 136 and 138 and overlie upper support pipe 134, to which their opposite ends are respectively slidably associated by tubular-shaped bearings 266 and 268. Upwardly extending from the slidable tubular-shaped bearings 266 and 268 are upright channel-shaped supports 270 and 272, which support bracing elements 274 and 276 connected at their other ends to the booms.

As has been stated hereinbefore, the front boom assembly 30 and the rear boom assembly 32 are pivotable in a manner as shown by FIGURE 4, to transfer a completed truss, which is shown in phantom, to be positioned thereupon, to a storage rack which is rearwardly of the unloading and storing unit 20. As shown by FIGURE 4, as the front and rear boom assemblies 30 and 32 are pivoted, the completed truss will slide downwardly therealong. In order to prevent the total displacement of the completed truss from the front and rear assemblies, automatically-operable front and rear finger assemblies 278 and 280 are provided for the front and rear boom assemblies 30 and 32 respectively. These finger assemblies must be capable of movement relative to the front and rear boom members 150 and 152 in order to enable truss gripping at the proper positions for varying truss sizes. Since the structure and operation of finger assemblies 278 and 280 are identical, only the front finger assembly 278 will be discussed in detail, with the counterpart structure of rear finger assembly 280 being appropriately numbered for reference thereto.

As shown in FIGURE 7, each of the finger assembly units 278 and 280 are mounted for threaded movement along a longitudinally extending rod, generally shown by numeral 282, which includes a threaded portion 284. Longitudinally extending rod 282 is mounted for rotative movement within the partial enclosure formed by the top and vertically disposed flanges 154 and 156, respectively, of the front and rear boom members 150 and 152. As shown by FIGURE 7, longitudinally extending rod 282 is journalled for rotation between bearing 286, which is supported by the horizontal flange 154, and bearing 288, which is supported by upright support members 136 and 138 of front and rear boom assemblies 30 and 32. As shown by FIGURES 1 and 7, the front and rear finger assemblies 278 and 280 are longitudinally movable along the threaded portion 284 of longitudinally extending rod 282. A more detailed description of the finger assembly and the means for longitudinally moving it along threaded rod 284 follows.

Appropriate front and rear hydraulic finger-positioning motors 290 and 292, for the front and rear boom assemblies 30 and 32 respectively, are provided. However, since the structure and physical cooperation of the motors 290 and 292 with the assemblies 30 and 32 are identical, only the operation and inter-relationship with other parts of front hydraulic finger-positioning motor 290 will be discussed, with the counterpart structure of rear motor 292 being appropriately identified for numerical reference thereto. As shown in FIGURES 2 and 7, hydraulic finger-positioning motors 290 and 292 are mounted on upright support members 136 and 138 of the front and rear boom assemblies 30 and 32. The rotors of the front and rear hydraulic finger-positioning motors 290 and 292 are rotatable in accordance with the appropriate hydraulic circuitry of FIGURE 12 and carry sprockets 296 and 298. Endless chains 300 and 302 connect driving sprockets 296 and 298 to driven sprockets 304 and 306. Driven sprocket 304 of the front boom assembly 30 is shown in FIGURE 7 to be connected to longitudinally extending rod 282 for rotation thereof. Accordingly, longitudinally extending rod 282 will be driven in accordance with the predetermined direction as established by front hydraulic finger-positioning motor 290. A similar structural setup exists for rear hydraulic finger-positioning motor 292.

As illustrated in FIGURE 7, front finger assembly 278 is capable of threaded movement along threaded portion 284 of longitudinally extending rod 282. More particularly, the front finger assembly 278 is provided with a main movable body 310 which has a threaded aperture therethrough for receipt of threaded portion 284 of longitudinally extending rod 282. As illustrated by FIGURE 9, the main movable body 310 is snugly received within the flanges of front boom member 150, and accordingly is capable of longitudinally, non-rotative movement along threaded portion 284 of longitudinally extending rod 282. Accordingly, as is well known, rotation of longitudinally extending rod 282 whose ends are rotatively fixed within bearing housing 286 and 288 will result in longitudinal movement of the main movable body 310, and therefore front and rear finger assemblies 278 and 280. The direction of travel of the front and rear finger assemblies 278 and 280 is, of course, established by the direction of rotation of the longitudinally extending rod 282. The direction of rotation of front and rear finger-positioning motors 290 and 292, which is controlled by the hydraulic circuitry of FIGURE 12, results in the concurrent movement of the front and rear finger assemblies 278 and 280 in the direction desired. In the event that the longitudinal positions of front finger assembly 278 and rear finger assembly 280 become misaligned, the hydraulic circuitry of FIGURE 12 permits the activation of front hydraulic finger positioning motor 290 only to realign the assemblies prior to the concurrent repositioning of both. While the motor driven finger-positioning system is shown, it of course is possible to provide other suitable arrangements, such as manual means, to position the finger assemblies 278 and 280 along the threaded portion 284 of longitudinally extending rod 282.

As shown in FIGURES 7 and 9, the front and rear finger assemblies 278 and 280 also each include an elongated truss engaging finger element 314 which is pivotally connected by pivot connection 316 to main movable body 310. A finger tip 318 is formed at the uppermost terminal end of the elongated truss-engaging finger element to prevent the truss from riding over the element. Elongated truss-engaging finger element 314 is connected by a link 320 and appropriate connecting pins 322 and 324 to counterbalancing member 326. Counterbalancing member 326 is pivotally connected by a suitable pivot connection 328 to the main movable body 310. Suitable counter-balancing weights 330 are fixedly connected to counterbalancing member 326 by way of bolts 332 and nuts 334. Lastly, a stop 336 is provided to limit the pivotal movement of elongated truss-engaging finger 314 due to the slipping truss.

During the lifting of a truss from a jig, the counterbalance link 326 maintains the elongated truss-engaging finger 314 in its non-projecting horizontal position as shown by FIGURE 7, but, upon front and rear boom assemblies 30 and 32 being pivoted by actuation of truss unloading cylinder 94, the elongated truss-engaging finger 314 assumes its operative position, as shown by FIGURE 8, to retain the completed truss upon the front and rear booms 150 and 152, and prevent the truss from sliding off. The sliding truss will be retained by the elongated fingers 314 of front and rear finger assemblies 278 and 280, which, in turn, will be driven about their pivot connections 316 until they limit against stops 336, which prevents further movement thereof.

As has been previously mentioned, the truss unloading and storing device, shown generally by the numeral 20 in FIGURE 1, must be able to accommodate varying sizes of trusses. To accomplish this, the front and rear boom assemblies 30 and 32, respectively, have been described as being mounted upon suitable bearings to permit slidable longitudinal movement toward and away from each other, on pivot pipe 76 and upper support pipe 134, to adjust the distance therebetween in accordance with the size of the truss to be manufactured. The structure by which the front and rear boom assemblies are selectively moved to predetermined positions along pivot pipe 76 and upper support pipe 134 will now be discussed.

As shown in FIGURE 2, a rotatable rod 338 extends through upright pivot brackets 72 and 74, suitable bearings being provided in the upright pivot brackets to permit rotation of rod 338. Referring to FIGURE 2, rod 338 is disposed intermediate pivot pipe 76 and upper support pipe 134 and is connected to terminal threaded rods 348 and 350 by couplings 344 and 346 and are journalled in bearings 356 and 358 provided respectively in terminal upright support members 130 and 132. Threaded rods 348 and 350 pass through fixed threaded bearings 352 and 354 respectively in upright support members 136 and 138. The fixed threaded bearings 352 and 354 cooperate with terminal threaded rods 348 and 350 to result in repositioning of the boom assemblies 30 and 32 relative to threaded rods 348 and 350, in accordance with the direction of rotation of rod 338. In this manner, rod 338 and threaded rods 348 and 350 will rotate between terminal upright support members 130 and 132 in accordance with the direction of rotation of the boom assembly positioning motor 360.

Boom assembly positioning motor 360, which is operable to longitudinally position front and rear boom assemblies 30 and 32 along frame assembly 36, is mounted between upright pivot brackets 72 and 74, as is seen in FIGURE 5. The boom assembly positioning motor 360 is welded to face 84 of upright pivot bracket 72, and an endless drive chain 362 extends from the rotor driven sprocket 364 of motor 360 to driven sprocket 366 which is fixedly mounted between upright pivot brackets 72 and 74 to rotatable rod 338. Pressurized fluid, from an appropriate hydraulic source, which will be discussed in greater detail in connection with FIGURE 12, is provided to the boom assembly positioning motor 360 by way of flexible hoses 368. Hoses 368 are shown connected to the manually operated double selector valve 102 for a purpose to be further discussed hereinbelow in connection with FIGURE 12.

Rotation of threaded rods 348 and 350 between fixed bearings 356 and 358 wil result in longitudinal repositioning of boom assemblies 30 and 32 in accordance with the direction and extent of rotation of threaded rods 348 and 350, through the threaded cooperation of threaded bearings 352 and 354 and threaded rods 348 and 350. The operation is similar to that discussed in connection with the description of the manner of positioning the front and rear finger assemblies 278 and 280. The inward longitudinal movement of front boom assembly 30 is limited by coupling 344, and its outward movement is limited by terminal upright support member 130. Similarly, the inward longitudinal repositioning of rear boom assembly 32 is limited by coupling 346, and its outward movement is limited by engagement with the terminal upright support member 132. It should be appreciated that the longitudinal repositioning of the front boom support 30 and rear boom support 32 is made in accordance with the span of the particular truss being manufactured. Accordingly, for larger trusses the spacing between asemblies 30 and 32 wil be greater than will be the case during manufacture of smaller trusses.

As has been brought out, a hydraulic boom assembly positioning motor 360 is provided to adjust the spacing between front boom assembly 30 and rear boom assembly 32. Hydraulic motors 290 and 292 are provided to adjust the positions of front finger assembly 278 and rear finger assembly 280, respectively, relative to the longitudinal front and rear booms 150 and 152. The front roller 180 associated with front boom 150 is driven by hydraulic truss positioning motor 186 to assist in the lifting and positioning of jig-mounted completed truss upon the rollers of the front and rear booms 150 and 152. Further, a truss unloading cylinder 94 is provided to pivot the front and rear boom assemblies after a completed truss has been properly positioned thereupon, and thus transfer the truss to an appropriate storage rack 22, in anticipation of the arrival of the next completed truss. The hydraulic circuitry, shown in FIGURE 12, controls the operation of the hereinabove described hydraulic motors and cylinders and will now be treated in greater detail.

Turning now to FIGURE 12, there is illustrated, in schematic form, the mechanism for actuation of the various hydraulic motors and hydraulic cylinder utilized in the unloading and storing apparatus of this invention. Hydraulic fluid from a suitable source 370 is passed through a suitable filter 372 and pressrized by a pump 374, which in turn is driven by electric motor 376. Fluid from the pump 374 passes by way of a hydraulic line 380 to a fourway, three-position finger positioning and aligning control valve 378, which controls the operation of finger positioning motors 290 and 292. The output of pump 374 is also connected to an adjustable high pressure relief valve 382, having a relief outlet 384 which is shown to be returned to source 370.

Finger positioning and aligning control valve 378 is a solenoid operated valve and is provided with two actuating coils 386 and 388, and is made up in three position sections 390, 392 and 394. The valve 378 is biased to its center or neutral position 392 by a pair of springs 396 and 398. Section 390 of the finger positioning and aligning control valve 378 will be designated, for purposes of discussion, as the forward section, and will indicate a movement of the selected finger assembly 278 or 280 toward the pivotally-connected ends of booms 150 or 152, likewise a movement of the finger assembly away from the pivotally connected ends of booms 150 and 152 will be referred to as reverse movement and is controlled by section 394, which will be designated the reverse section. Finally, the center section 392 is the control valve's neutral position and it is to this position that the input fluid line 380 is connected.

As shown by FIGURE 12, the input sides of each of the neutral positions of all of the solenoid operated control valves are connected in series. More specifically, the inlet side of neutral position 392 of the finger positioning and aligning control valve 378 is connected to the input side of neutral section 420 of truss positioning valve 412, and, similarly, the neutral position 420 of truss positioning valve 412 is connected to the input side of neutral position 438 of the truss unloading cylinder and boom assembly positioning valve 430. Finally, the input side of the neutral position of the valve 430 is shown to be connected to source 370 by way of line 380 and filter system 446.

As illustrated in FIGURE 12, the finger assembly positioning and aligning control valve 378 is connected to a manually operable double selector valve 400. More particularly, the output ports of the neutral section 392 are connected by way of leads 402 to the finger positioning section 403 of the double selector valve 400. Section 404 of the double selector valve 400 enables the activation of a single finger positioning motor to permit alignment between the front and rear finger assemblies 278 and 280. Double selector valve 400 is provided with a manual operating lever 406 to permit connection of the desired section with the leads 402 from the output ports of the finger assembly positioning and aligning control valve 378. Leads 408 are shown to connect the output ports of section 403 of the double selector valve 400 with finger assembly positioning motors 290 and 292 to enable concurrent operation of the motors in either their forward or reverse directions in accordance with the position of the solenoid operated finger assembly positioning and aligning control valve 378. On the other hand, leads 410 operatively connect the output ports of section 404 of the double selector valve 400 to only motor 290 and thus permits only the operation of the motor 290 in either its forward or reverse direction, in accordance with the setting of the finger assembly positioning and aligning control valve 378.

Accordingly, if the finger assembly units 278 and 280 are unaligned, they may be aligned by positioning the double selector valve 400 such that section 404 thereof is operatively connected to leads 402 of the finger assembly positioning and aligning control valve 378, to result in movement of only the front finger assembly 278.

Upon energization of solenoid winding 388, by operation of suitable circuitry by the control operator, the finger assembly positioning and aligning control valve 378 will be moved to the right, compressing the spring 398 and bringing the forward section 390 between the inlet and outlet so that high pressure fluid is supplied from input line 380, forward section 390, output lines 402, and section 403 of the double selector valve 400 to front and rear finger positioning motors 290 and 292 concurrently to result in the joint movement of both the front and rear finger assemblies 278 and 280 toward the pivotally connected ends of boom supports 150 and 152.

On the other hand, with manually operable double selector valve 400 remaining in the position shown and solenoid winding 386 being energized, the finger assembly positioning and aligning control valve 378 will be moved to the left, compressing spring 396, and bringing the reverse section 394 between the inlet and outlet of valve 378 so that high pressure fluid will then be supplied to both the finger positioning motors 290 and 292 to result in movement of their associated front and rear finger assemblies 278 and 280 away from the pivotally connected ends of the booms 150 and 152.

Upon the double selector valve 400 being repositioned, by way of manually operable lever 406, such that output leads 402 of finger assemblies positioning and aligning valve 378 are operatively connected to the input ports of boom section 404, and with the finger assemblies positioning and aligning control valve 378 having either its forward section 390 or its reverse section 394 aligned with the inlet and outlet ports, only the front finger assembly 278, controlled by motor 290, will be moved in a direction as established by the setting of valve 378 to realign itself in the position of rear finger assembly 280.

A solenoid operated truss positioning valve 412 having actuating coils 414 and 416 and being made up of three sections 418, 420 and 422 is biased to its central or neutral position by a pair of springs 424 and 426. As shown, the neutral or central section 420 of truss positioning control valve 412 is shown to be serially connected by way of line 389 to the neutral section 392 of the finger assemblies positioning and aligning control valve 378. Section 418 of the truss positioning control valve 412 will be designated the forward section thereof, and section 422 will be designated its reverse section. Operation of the solenoid controlled truss positioning control valve 412 such that its forward section 418 is moved between the inlet and outlet thereof will result in a forward movement of the truss positioning motor 186, which is shown to be connected to the outlet of the truss positioning control valve 412 by way of lines 428. Section 418 has been designated, for purposes of discussion, as the forward section, and will result in rotation of roller 180 in a direction to assist the positioning of a jig-mounted truss upon booms 150 and 152 on contact being established therebetween. Rotation of roller 180 in the opposite direction will be designated as its reverse direction, and movement in the reverse direction is controlled by section 422 of truss positioning control valve 412. Therefore, truss positioning control valve 412 will have either its forward section 418 or its reverse section 422 operatively positioned between the inlet and outlet in accordance with whether or not solenoid winding 414 or 416 is actuated.

Truss positioning motor 186 will be driven in either its forward or reverse direction in accordance with the selective actuation of truss positioning control valve 412.

A truss unloading cylinder and boom assemblies positioning motor control valve 430, which is a solenoid valve having actuating coils 432 and 434, and is made up of three sections 436, 438 and 440, is shown to be in its central or neutral position due to the biasing action of springs 442 and 444. Section 436, which will be designated for purposes of discussion as the forward section of the control valve 430, will indicate a pivotable unloading action of the truss unloading cylinder 94.

The inlet of control valve 430 is supplied pressurized fluid by way of line 380, shown connected to neutral section 438 thereof. Also, line 380 is shown to be connected to system return filter 446. In turn, the fluid cycle is completed by connection of the return filter to supply source 370. The outlets of truss unloading cylinder and boom assemblies positioning motor control valve 430 are connected by lines 448 and 450 to manually operable double selector valve 102. Fluid line 450 in addition is connected to a suitable flow regulator 452 which is, in turn, connected to supply source 370 to return any fluid passing through the flow regulator thereto.

The double selector valve is provided with truss unloading cylinder operating section 454, to which the hoses 100 are shown to be connected, and boom assemblies positioning motor section 456. The double selector valve 102 is manually operable by a lever 458 to position either section 454 or 456 in circuit with fluid input lines 448 and 450.

Hoses 100 of truss unloading cylinder operating section 454 of the double selector valve 102 are shown to be connected to end plates 96 and 98, see FIGURE 5, as explained hereinbefore, to supply pressurized fluid to opposite sides of the piston 116, to insure reciprocal movement thereof. With the manually operable double selector valve 102 connected in the position shown, and upon actuation of solenoid winding 434, the truss unloading cylinder and boom assemblies positioning motor control valve 430 will be moved against the biasing force of spring 444 to bring the forward section 436 between its inlet and outlet. Under these conditions, piston 116 will be forced outwardly of its associated cylinder to pivot the front and rear boom assemblies 30 and 32 about pivot pipe 76 and transfer a completed truss positioned thereupon to appropriate storage rack 22, see FIGURE 4. Actuation of solenoid valve 432 will result in movement of valve 430 against the biasing force of spring 442 to bring the reverse section 440 between the valves inlet and outlet. Under these conditions, piston 116 will be forced inwardly of its cylinder to return the front and rear boom assemblies to the horizontal position shown in FIGURES 1 through 3.

On the other hand, actuation of boom assembly positioning motor 360 will occur upon the double selector valve 102 being manually positioned by its associated lever such that the boom positioning motor actuating section 456 is placed in circuit with lines 448 and 450. Therefore, upon actuation of solenoid winding 434, forward section 436 of control valve 430 will be positioned between the inlet and outlet thereof to supply pressurized fluid to hydraulic boom assembly positioning motor 360.

For purposes of discussion, the supply of pressurized fluid to hydraulic boom positioning motor 360 from forward section 436 of control valve 430 drives sprocket 366, see FIGURE 5, in such a way as to rotate threaded rods 348 and 350 and to drive the threaded bearings 352 and 354 of the front and rear boom assemblies 30 and 32 in a direction to result in converging movement therebetween. In this manner, the booms 150 and 152 will be brought closer together to accommodate smaller size trusses. Contrarywise, upon solenoid winding 432 being energized, reverse section 440 will be positioned between the inlet and outlet of truss unloading cylinder and boom assemblies positioning motor control valve 430. In this latter case, boom assemblies poisitioning motor 360 will be driven in a direction to result in the boom assemblies 30 and 32 being driven further apart to accommodate larger truss sizes.

A truss storage rack 22 is shown to be mounted immediately adjacent to and behind the truss unloading and storage apparatus of this invention. The sides 460 and 462 of the storage rack are spaced apart to permit the pivotal movement of booms 150 and 152 of the front and rear boom assemblies thereinto. Also the upper supporting members 464 and 466 are shown to be downwardly and backwardly inclined, and are provided with rollers 468 along their upper surfaces, to enable the trusses as they are seated thereupon by movement of the booms 150 and 152 between the spaced apart upper supporting members, to automatically be transferred to the back of the rack.

In operation, in accordance with the predetermined decision as to the particular size of truss to be constructed, the boom positioning motor 360 will have been activated to position boom assemblies 30 and 32 in their proper relative spacial positions to accommodate the particular size of truss to be manufactured. Likewise, front and rear finger assemblies 278 and 280 will have been moved to the desired positions relative to booms 150 and 152 by actuation of finger positioning and aligning motors 290 and 292. The front boom assembly 30 will have its boom 150 and rear boom assembly 32 will have its boom 152 locked to prevent longitudinal movement relative to conveyor 18, by the cooperation of the depending latching tabs 166 of triangular frames 162 and 164 and the kerfs of front and rear kerfed locking members 168 and 170.

In this position, front boom 150 and rear boom 152 are adequately spaced above the conveyor system 18 so that the jig may pass therebelow without interference, and, at the same time, the front boom ramp 214 which is downwardly and angularly disposed from front roller 180, will be at the proper elevation to peel the leading end of the completed truss from the jig to which it is mounted. As the leading portion of a completed truss and the jig upon which it is carried emerges from the press, the operator will activate truss positioning motor 186 and cause forward rotative movement of front roller 180. Thereafter, the front boom ramp 214 will intercept the leading end of the truss and with continual movement of the jig thereunder, will elevate and place the leading end upon the front roller 180 of front boom 150. The continual movement of the jig and the rotation of roller 180 will result in the completed truss being entirely supported upon the front and rear boom assemblies 30 and 32.

As the leading end of the completed truss is driven from the leading powered roller 180 toward the rear roller unit 202, it is held in proper elevational disposition by helper roller unit 222, which has been positioned by cooperation of its latching bolt 248 and the apertured channel-shaped locking bracket 176 to a proper position along the path of travel of the elevated truss, between the front and rear boom assemblies. In this manner, the leading end will be supported at the proper elevation for transfer to the rear boom ramp 152 and, more particularly, to a resting position upon rear roller unit 202. Upon the leading end of the completed truss assuming its proper position upon rear roller unit 202, and, at the same time, the trailing end thereof being positioned upon powered rotating front roller 180, the operator will deactivate the truss positioning motor 186, and thus prevent the truss from being driven off the powered leading roller 180.

The completed truss has now been effectively removed from the jig and is positioned upon the front roller 180 and rear roller unit 202. At this point the operator actuates the truss unloading hydraulic cylinder 94. Actuation of the truss unloading hydraulic cylinder 94 will drive its associated piston 116 outwardly of its cylinder to result in the front and rear boom assemblies 30 and 32 being pivoted about pivot pipe 76 and upper support pipe 134, in the manner as shown by FIGURE 4. However, as has been explained, upon the front and rear booms 150 and 152 being elevated, the weighted counterbalancing link 326 of front and rear finger assemblies 278 and 280 are effective to move the fingers 314 into their truss-retaining positions as shown in FIGURE 4.

Continuing pivotal movement of the front and rear boom assemblies about pivot pipe 76 and upper support pipe 134 will result in their movement between the angularly disposed, spaced apart upper supports 464 and 466 of storage rack 22 and accordingly result in the transfer of the completed truss thereupon. The rollers 468 and 470 of the upper supports 464 and 466 of rack 22, along with their rearward inclination, will then be effective to move the truss toward the back of the storage rack 22. At this time the operator reverses the flow of fluid into hydraulic cylinder 94 and repositions the boom assemblies to their horizontal positions as shown in FIGURE 3. The apparatus is now in position for the removal and unloading of the next truss.

It is apparent from the above that the present invention provides a novel apparatus which is adjustable to accommodate varying sizes of trusses to be manufactured and automatically removes and stores the jig-mounted completed trusses. The apparatus is capable of performing the removal and storage operation entirely unassisted. By the automation of the operations by which a completed truss is removed from its associated jig and transferred to a suitable storage rack, the speed of the operation will be greatly increased with the resulting increase in truss production.

The invention may be embodied in other specific forms without departing from the spirit or essential characteristics thereof. The present embodiments are therefore to be considered in all respects as illustrative and not restrictive, the scope of the invention being indicated by the appended claims, rather than by the foregoing description and all changes which come within the meaning and range of equivalency of the claims are therefore intended to be embraced therein.

What is claimed and desired to be secured by United States Letters Patent is:

1. Apparatus for unloading and storing press manufactured jig mounted wooden framing elements, comprising storage means for said wooden elements, means for moving a jig carrying a wooden element along a predetermined path of travel, a pair of rollers spacially positioned along, transverse to and above the path of travel of the jig, said rollers being in a first generally horizontal position, means for moving said wooden element from said jig to a position upon said generally horizontal rollers, and means for moving said pair of rollers from their first generally horizontal position to a second upright position to transfer the wooden element to said storage means.

2. Apparatus as set forth in claim 1, including means for moving said pair of rollers to adjust the spacing therebetween in the direction of movement of said jig so as to permit said rollers to handle different sizes of wooden elements being manufactured.

3. Apparatus as set forth in claim 1, including means for driving the roller first encountered by said jig as it moves along its predetermined path of travel whereby said roller drives a wooden structural element received on said rollers.

4. Apparatus as set forth in claim 3, including means for moving said pair of rollers to adjust the spacing therebetween in the direction of the movement of the jig so as to permit said rollers to handle different sizes of elements being manufactured.

5. Apparatus as set out in claim 1, including elevating means positioned along the path of jig travel, in front of the roller first encountered by the jig as it moves along its path of travel, said elevating means being so positioned as to elevate the leading end of the completed wooden element and direct the same toward the first roller, the continuing forward movement of the jig sub-adjacent said roller resulting in the positioning of the wooden element thereupon.

6. Apparatus as set forth in claim 5, including means for rotating said first roller to cooperate with the continuing forward movement of the jig to position the completed wooden structural element upon said pair of rollers.

7. Apparatus as set out in claim 1, including a helper roller adjustably mounted for positioning along the path of jig travel, between the pair of spaced apart rollers, to assist in positioning of the completed wooden structural element thereupon.

8. Apparatus as set forth in claim 5, including means for moving said pair of rollers to adjust the spacing therebetween in accordance with the size of wooden structural element being manufactured, and a helper roller adjustably mounted for positioning along the path of jig travel, between the pair of spaced apart rollers, to assist in positioning of the completed wooden structural element thereupon.

9. Apparatus for unloading and storing press manufactured, jig mounted trusses comprising means for moving a jig mounted truss along a predetermined path of travel, a pivotable frame assembly mounted adjacent to the path of travel of said jig and carrying first and second rotatable rollers, said first and second rotatable rollers being spacially positioned along and above the path of travel of said jig, in a first generally horizonal position, means for positioning said trusses upon said first and second rollers in response to movement of the jig sub-adjacent thereto, and power means for pivoting said pivotable frame assembly into a second generally upright position to transfer a truss supported thereupon to storage.

10. Apparatus as set out in claim 9, including truss elevating means operatively positioned along the path of jig travel, forwardly of said rollers, elevating the leading end of the jig mounted truss and directing the same upon said first roller.

11. Apparatus as set out in claim 9, including means for adjustably positioning said rollers relative to each other in the direction of movement of said jig, in accordance with the size of the truss being manufactured, and truss elevating means operatively positioned along the path of jig travel, forwardly of said rollers, elevating the leading end of the jig mounted truss and directing the same upon said first roller.

12. Apparatus as set forth in claim 9, including truss retaining means operatively mounted for movement with said rollers, said truss retaining means being operable in response to pivoting of said rollers to move into a position to retain the truss thereupon as the rollers move toward said second position.

13. Apparatus as set out in claim 12, including means for positively driving said first roller to assist, in positioning the completed truss upon said first and second rollers.

14. Apparatus as set forth in claim 13, including means for repositioning at least one of said truss retaining means along the length of its associated roller.

15. Apparatus for unloading and storing press manufactured, jig mounted trusses, the jigs being transferred along conveyor means for movement into and out of the press, comprising a pivotable supporting assembly including a pair of elongated vertically spaced support members longitudinally extending along the conveyor means at the output side of the press, front and rear spaced-apart boom assemblies mounted for longitudinal movement along said pair of elongated support members, and movable therewith, said front and rear boom assemblies each having an elongated boom member extending from the pivotable support assembly transversely across and above the conveyor means upon which the jig is movable, roller means mounted on each of said front and rear boom assemblies, means for elevating said completed truss from said jig progressively starting at one end and positioning it upon said roller means, and means for driving said pivotable support assembly pivotally to transfer the completed truss from said roller means to storage.

16. Apparatus as set forth in claim 15 wherein each of said front and rear boom assemblies has affixed thereto a threaded bearing, a rotatable threaded shaft threadedly connected with each of said threaded bearings, drive means operatively connected to said shaft for rotation thereof to adjust the relative positions of the boom assemblies along said longitudinally extending support members to accommodate varying sizes of trusses.

17. Apparatus as set forth in claim 16, including truss elevating means operatively connected to said booms above and along the path of jig travel, to elevate the leading end of the truss such that the continual movement of said jig sub-adjacent said rollers results in the positioning of said truss upon said rollers.

18. Apparatus as set forth in claim 17, including driving means operatively connected to at least said first roller for rotating the same and assisting in cooperation with the continual movement of said jig in positioning said completed truss upon said rollers.

19. The apparatus as set out in claim 17, wherein each said boom member has affixed to its distal end a locking means engageable with said conveyor means to lock the boom members to said conveyor means and prevent longitudinal movement thereof during the positioning of a truss thereupon.

20. Apparatus as set out in claim 15, including a threaded rod rotatably mounted to each of said boom assemblies, a truss gripping assembly associated with each of said boom assemblies and including a threaded body movable along said boom members, said threaded rods being threadedly connected to said movable bodies, a finger element pivotally connected to each said movable body, counter-balancing means pivotally connected to said movable body and to said finger element to retain the same in a non-gripping position for so long as said boom assemblies remain in their horizontal positions, said fingers being extended in a truss gripping position in response to pivotable movement of said boom assemblies to their upright positions to retain said truss upon said roller means.

21. The apparatus as set out in claim 20, including means for rotating said threaded rods to position said truss gripping assemblies relative to said boom assemblies.

22. The apparatus as set out in claim 21, including a helper roller mounted to said conveyor means between the pair of boom assemblies said helper roller being movable for adjustable positioning along the path of jig travel.

23. An apparatus for removing trusses from jigs moving along a conveyor comprising a pair of spaced booms extending transversely across said covenyor and carrying roller means, support means mounting said booms for pivotal movement from a first substantially horizontal position to a second generally upright position, said booms when in said first position being above the jig from which a truss is to be removed, means for elevating the forward end of a truss from its jig as it approaches a boom, the truss coming to rest on said roller means above said jig, a truss retaining means associated with each boom and movable into a truss retaining position for retaining the truss on the booms as the booms are rotated to said second generally upright position, drive means for moving said booms from said first to said second position, adjustment means for moving said booms relative to one another along the direction of travel of the jig, and means for moving said truss retaining means along said booms.

24. An apparatus as set out in claim 23, including truss storage means adjacent said booms, said truss storage means having a pair of truss receiving surfaces so positioned as to receive the lowermost edges of a truss as the booms pivot into said second position so that the movement of said booms causes the truss to be lifted from said booms and truss retaining means onto said storage surfaces.

25. An apparatus as set out in claim 24, including a truss elevating ramp carried by the distal end of each boom.

26. An apparatus as set out in claim 25, including a helper roller means mounted on said conveyor between said booms, said helper roller means being adjustably mounted for positioning along the direction of travel of said jig.

27. An apparatus as set out in claim 23, wherein said drive means for moving said booms comprises a pair of spaced and substantially parallel pipes slidably received by a pair of spaced supports, the lowermost of said pipes being carried by a fixed support means, said spaced supports being pivotable about said lowermost pipe, said booms being mounted on said spaced support means which are slidable along said pipes, a boom positioning rod mounted substantially parallel to said pipes and having threaded portions screw threadedly engaging said spaced support means, means for driving said rod to move said spaced support means and attached booms toward and away from one another, each of said booms carrying therewith a threaded rod screw threadedly engaging said truss retaining means, means carried by said spaced support means for driving said last-named rods to position said retaining means.

28. An apparatus as set out in claim 27 wherein said truss retaining means move into a truss retaining position under the influence of gravity.

References Cited

UNITED STATES PATENTS

| | | | |
|---|---|---|---|
| 1,495,339 | 5/1924 | Maher | 214—38 |
| 1,564,420 | 12/1925 | Kirchner | 214—38 |
| 2,148,371 | 2/1939 | Galloway | 214—7 X |
| 3,109,640 | 11/1963 | Schneckloth | 214—1 X |

GERALD M. FORLENZA, *Primary Examiner.*

R. J. SPAR, *Assistant Examiner.*